United States Patent
Barber

(10) Patent No.: US 7,427,342 B2
(45) Date of Patent: Sep. 23, 2008

(54) METHOD AND APPARATUS FOR SHIFTING CURRENT DISTRIBUTION IN ELECTRODEIONIZATION SYSTEMS

(75) Inventor: John Barber, Fergus (CA)

(73) Assignee: General Electric Company, Schenectady, NY (US)

( * ) Notice: Subject to any disclaimer, the term of this patent is extended or adjusted under 35 U.S.C. 154(b) by 86 days.

(21) Appl. No.: 11/445,954

(22) Filed: Jun. 2, 2006

(65) Prior Publication Data

US 2007/0278099 A1    Dec. 6, 2007

(51) Int. Cl.
*B01D 61/48* (2006.01)
*B01D 61/44* (2006.01)

(52) U.S. Cl. .................. 204/524; 204/536; 204/632

(58) Field of Classification Search .................. 204/524, 204/536, 632
See application file for complete search history.

(56) References Cited

U.S. PATENT DOCUMENTS

| | | | |
|---|---|---|---|
| 5,891,328 | A | 4/1999 | Goldstein |
| 6,274,019 | B1 | 8/2001 | Kuwata |
| 6,284,124 | B1 * | 9/2001 | DiMascio et al. ........... 205/753 |
| 6,391,178 | B1 | 5/2002 | Garcia et al. |
| 6,514,398 | B2 | 2/2003 | DiMascio et al. |

FOREIGN PATENT DOCUMENTS

WO    WO98/51620    11/1998

OTHER PUBLICATIONS

Grabowski et al., "The production of high-purity water by continuous electrodeionization with bipolar membranes: Influence of the anion-exchange membrane permselectivity" Journal of Membrane Science, Elsevier Scientific Publ., Company, Amsterdam, NL, vol. 281, No. 21-2, Apr. 18, 2006.

* cited by examiner

*Primary Examiner*—Arun S Phasge
(74) *Attorney, Agent, or Firm*—Wegman, Hessler & Vanderburg

(57) ABSTRACT

An electrodeionization (EDI) apparatus and method comprising an ion-depleting chamber for removing ions from liquids passed therethrough, wherein a resistive component is coupled proximate the outlet region of the chamber so as to increase the electrical resistance of the outlet region of the chamber with respect to the inlet region of the chamber. The resistive component may be coupled to the ion-selective membranes bordering the diluting chamber and/or the concentrate chambers. In an alternative embodiment, the resistive component may be coupled between the ion-exchanging media particles themselves within the ion-depleting chambers. In each embodiment, the electrical resistance of the outlet region is increased with respect to the inlet region of the chamber, with results being that electrical current is shifted from the outlet region toward the inlet region, thus enhancing overall deionization performance of the EDI device.

18 Claims, 3 Drawing Sheets

METHOD AND APPARATUS FOR SHIFTING CURRENT DISTRIBUTION IN ELECTRODEIONIZATION SYSTEMS

FIELD OF THE INVENTION

The present invention relates generally to an improved electrodeionization system, and more particularly relates to an electrodeionization system and method in which the conductivity of particular zones in the resin bed can be altered to improve the deionization process.

BACKGROUND OF THE INVENTION

Electrodeionization (EDI) systems are used to remove ions from liquids, especially water. These systems require a power supply that applies voltage to the EDI module to refine industrial process water to ultra-high purity for use in the power, microelectronics, food, chemical, pharmaceutical, and other industries.

In typical electrodeionization devices, electrical current flows through the bed of ion exchange resin. The resin bed is contained on either side, perpendicular to the flowing current, by ion-exchange membranes. The current passes through the bed via ion migration through both the solution and the ion-exchange beads, with water dissociation occurring at the anion-cation, bead-bead and bead-membrane interfaces. The electrical potential required to pass this current is dependent on the mobility of the ions in the ion-exchange phase of the beads and the membrane, the mobility of the ions in the solution surrounding the beads and the potential required for water dissociation.

In an electrodeionization device, the impurity ions are fed into one end of the bed, perpendicular to the applied current flow and the pure water exits the other end of the ion-exchange bed. This situation sets up a gradient for the impurity ions from the inlet to the outlet of the bed, e.g., with a $NaHCO_3^-$ feed the ion-exchange media at the inlet will be predominantly in the $Na^+$ and $HCO_3^-$ forms, and will gradually decrease in $Na^+$ and $HCO_3^-$ concentrations towards the outlet. In the outlet region the ion-exchange media are predominantly in the regenerated $H^+$ and $OH^-$ forms. In a mixed or layered diluting chamber electrodeionization device processing a normal reverse osmosis permeate, this gradient in speciation, from inlet to outlet, results in the inlet of the device being less conductive than the outlet due to the relative mobilities of $Na^+$ and $HCO_3^-$ being much less than those of $H^+$ and $OH^-$. Consequently, when a constant potential is applied across the EDI device the current flowing at the outlet is significantly larger than the current at the inlet.

There are several factors which are known to influence the mobility of the ions in a bed of ion-exchange media, such as: (1) the nature of the ionic species, i.e., for cations, $H^+$ vs. $Na^+$ vs. $Ca^{2+}$; (2) the nature of the ion-exchange material including the percentage cross-linkage, concentration of ion-exchange sites, distribution of ion-exchange sites, and the bead surface structure; (3) the concentration of the ionic species; (4) the quantity of anion-cation bead-bead interfaces; (5) the quality of the anion-cation bead-bead interfaces; (6) the composition of the solvent being processed through the device; and (7) temperature.

It is known that the ability of the EDI device to remove impurity ions and thus produce high purity product water is significantly dependent on the distribution of the regeneration current. Attempts have been made to modify the conductivity of the anion and cation ion exchange phases in an EDI device to improve deionization performance such as those described in U.S. Pat. Nos. 6,284,124 and 6,514,398 to DiMascio et al. The DiMascio et al. devices are characterized by an ion-depleting compartment having alternating layers of ion exchange resin material wherein a dopant material is added to one of the layers to reduce the difference in conductivity between the alternating layers.

What is not taught or suggested by the prior art is an improved EDI device comprising at least one resistive component coupled to the bead-membrane interface near the outlet region of the device to increase the electrical resistance of the outlet region with respect to the inlet region of the device in a relatively simple and cost effective manner, thus increasing the current distribution at the inlet region of the device with respect to the outlet region of the device and enhancing the overall deionization performance of the device. It would also be desirable to have an improved EDI device which is easily adaptable to a variety of different applications.

SUMMARY OF INVENTION

The present invention has been developed in response to the present state of the art, and in particular, in response to the problems and needs in the art that have not yet been fully solved by currently available EDI devices. Accordingly, the present invention has been developed to provide an improved electrodeionization (EDI) apparatus comprising an ion-depleting dilute chamber for removing ions from liquids passed therethrough, wherein at least one resistive component is coupled proximate the outlet region of the chamber to either one or both of the anion and cation membranes adjacent the ion-depleting chamber. The resistive component functions to increase the electrical resistance across the outlet region of the chamber with respect to the inlet region of the chamber by virtue of the added resistance of the resistive component itself and/or because the resistive component effectively decreases the bead-membrane contact area. The resistive component may be placed on either the diluting or concentrate sides (or, alternatively, on both sides) of the membrane(s). By increasing the electrical resistance of the outlet region with respect to the inlet region of the chamber, improvement is made in the electrical current distribution between the inlet region and the outlet region of the chamber, thus enhancing the deionization performance of the EDI device. Moreover, by altering the shape, size, composition and/or location of the resistive component, the current distribution in the dilute chamber can be easily controlled, thus providing an EDI device which is easily adaptable to a variety of different applications and operating conditions.

The present invention has also been developed to provide a method for improving the balance of current throughout the ion-depleting chamber comprising providing ion-selective membranes (e.g., anion and cation membranes) on opposing sides of the ion-depleting chamber between the inlet and outlet ends of the chamber, and then coupling at least one resistive component to either one or both of the ion-selective membranes proximate the outlet region (on either or both the dilute or concentrate sides) so as to increase the electrical resistance of the outlet region with respect to the inlet region. In operation, liquids are passed through the ion-depleting chamber from the inlet region toward the outlet region, and an electric field is applied across the chamber transverse to the flow direction of the liquids. At least one resistive component is coupled to one or both of the ion-selective membranes proximate the outlet region of the chamber, with results being that the percentage of electrical current flowing through the outlet region is reduced while the percentage of electrical current flowing through the inlet region is increased, thereby enhancing the overall ion-depleting performance of the EDI apparatus.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2b is a schematic, cross-sectional view through an ion-depleting chamber of an electrodeionization (EDI) device configured in accordance with an exemplary embodiment of the present invention, illustrating the improved current distribution percentage in selected zones of the chamber compared to the configuration of FIG. 2a.

DESCRIPTION

Figure 1A:
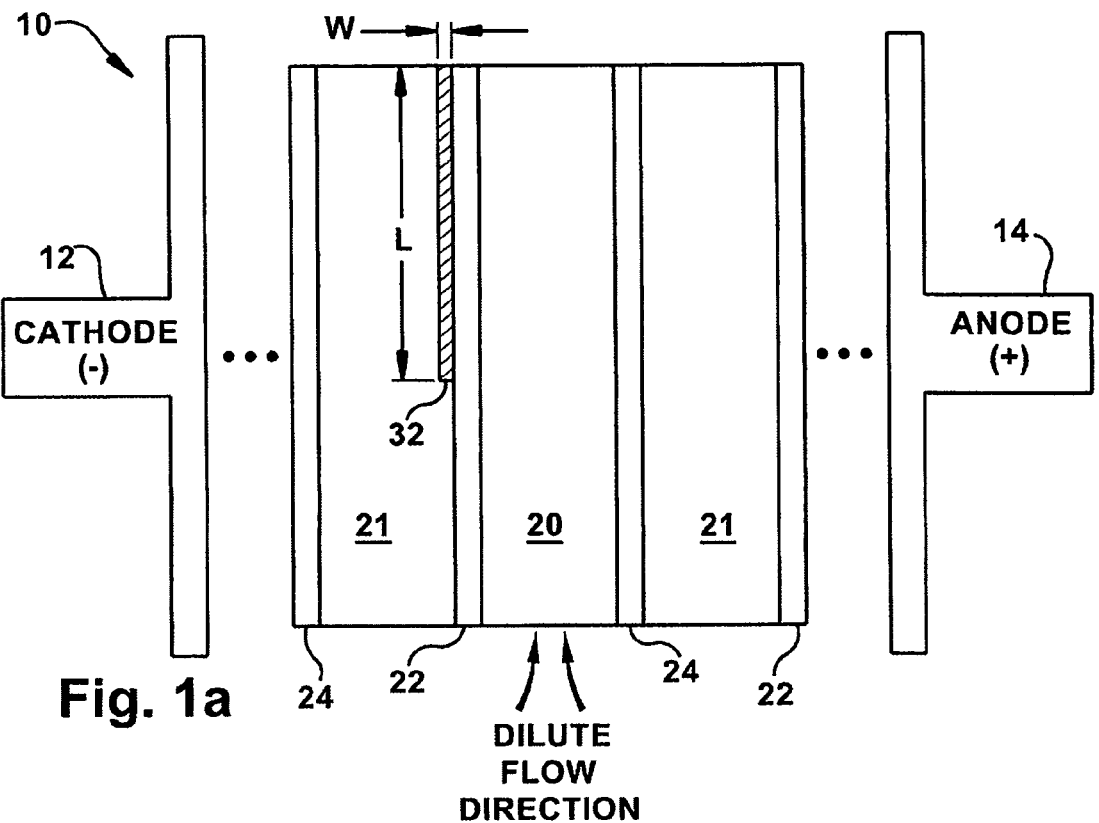
FIG. 1a is a schematic, cross-sectional view through an ion-depleting chamber according to an exemplary embodiment of the present invention, illustrating one configuration of a resistive component coupled to the concentrate side of the cation-selective permeable membrane.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment.

This present invention describes an improved electrodeionization (EDI) device comprising means by which the conductivity of any particular zone within the resin bed of the deionization chamber can be altered to improve the overall deionization process.

It has been found that the current distribution throughout the deionization chamber impacts the penetration depth of the impurity ions into the resin bed, resulting in there being an optimum current distribution throughout the resin bed which minimizes this penetration depth for a given EDI device design, at a chosen overall current.

The present invention thus provides an improved electrodeionization (EDI) device and method in which the conductivity of any particular zone in a resin bed can be altered to improve the deionization process. In one exemplary embodiment, the present invention provides more uniform electric current distribution throughout the resin bed by the addition of a resistive component between the membrane and beads in either the diluting or concentrate chambers. The material chosen for the resistive component in the exemplary embodiments was a polymer mesh material, although it is understood that many other materials could be used to provide a layer of substantially non-conducting particles adjacent the bead-membrane interface proximate the outlet region of the ion-depleting chamber to achieve the same or similar results. For example, it is contemplated that a layer of resistive resin beads or other resin material could be provided adjacent the bead-membrane interface proximate the outlet region to increase the resistance of the outlet region. It is also understood that the resistive component could be configured as a spacer adapted to effectively decrease the bead-membrane contact area proximate the outlet region, thereby increasing the resistance of the outlet region with respect to the inlet region. In addition to the exemplary embodiments disclosed herein, those skilled in the art will appreciate that the resistive component may take many different forms, shapes and compositions, so long as it functions to increase the resistance of the outlet region of the chamber with respect to the inlet region when it is placed adjacent the bead-membrane interface in proximity to the outlet region. The present invention is also characterized in that the resistance of particular zones inside the bed can be controlled by the shape and size of the resistive component, for example by changing the openness of the mesh, the mesh thickness, and the fraction of the chamber containing the mesh and the number of mesh pieces/cell-pair.

The concepts of the present invention can be better understood by recognizing that the conductivity of a particular zone in the ion exchange bed can be affected by at least some of the following ways: (1) the addition of a resistive component between the membrane and beads in either the diluting or concentrating chambers (in the exemplary embodiments disclosed herein, the material chosen for the resistive component was a polymer mesh); (2) the addition of a resistive component into the ion-exchange bed, between bead-bead interfaces in either the diluting or concentrating chambers (this has been demonstrated using a polymer melt that gave a partial bead coating); (3) increasing or reducing the bead contact pressure in the resin bed (this is most easily achieved by varying the mass of ion-exchange material per unit volume in a particular zone of the bed); and (4) increasing or reducing the number of cation/anion ion-exchange contact points (this can be achieved with the utilization of patterning of the ion-exchange beads or by adjustments of the cation/anion ion-exchange ratio).

According to an exemplary embodiment of the present invention, a polymer mesh has been placed on the surface of the membranes. This mesh restricts the bead-membrane contact area at the bead-membrane interface (thus increasing the electrical resistance), and can be placed on either the dilute or concentrate side of the membrane. Accordingly, increases in chamber resistance, and the resistance of particular zones inside the bed can be controlled by the shape, size and composition of the mesh including, but not limited to the openness of the mesh, the mesh thickness, the fraction of the chamber containing the mesh and the number of mesh pieces/cell-pair. As illustrated in more detail in Example 1 below, placing the polymer mesh near the outlet region of the cation membrane (either concentrate or dilute sides) effectively shifts a fractional percentage of the electrical current flowing through the deionization chamber towards the inlet region of the chamber, thus enhancing the overall deionization performance.

Turning now to FIGS. 1a-1d which illustrate exemplary embodiments of the present invention, there is shown a flow-through electrodeionization (EDI) module 10 including an ion-depleting dilute chamber 20 positioned between concentrate chambers 21. For ease of illustration, a single diluting chamber 20 is shown bordered by a pair of concentrate chambers 21. However, it is understood that the present invention may also be practiced with an EDI device comprising one or more alternating dilute/concentrate cell-pair modules disposed between the anode 14 and cathode 12 in a manner known in the art without departing from the broader scope of the present invention.

Referring again to FIGS. 1a-1d, cation-selective membranes 22 and anion-selective membranes 24 are positioned on opposing peripheral sides of the dilute chamber 20. In turn, an anode 14 and a cathode 12 are disposed on opposing ends of the module 10 to supply a voltage transversely across the at least one dilute and concentrate chambers 20, 21. Typically, the chambers 20, 21 may be filled with electroactive resin beads (not shown) to facilitate ionic exchange in a manner known in the art. Fluids are directed into the inlet (i.e., bottom of figure) of the dilute chamber 20 in the direction shown by the dilute flow direction arrows. In turn, purified fluid exits the outlet (i.e., top of figure) of the dilute chamber 20.

FIGS. 1a-1d illustrate exemplary embodiments of the present invention in which a resistive component 32 is disposed proximate the outlet region of the dilute chamber 20. For purposes of the exemplary embodiments disclosed herein, the resistive component 32 chosen for experimentation was a polymer mesh having a predetermined length L and surface structure thickness W. Preferably, the length L of the resistive component 32 comprises about 50 percent of the overall length of the chamber length, although it is understood that fractional lengths greater than or less than 50 percent may be used without departing from the broader scope of the present invention so long as the resistive component is disposed in proximity to the outlet region of the chamber, regardless of whether of portion of the resistive component also covers a portion of the inlet region. Moreover, it is also contemplated that various thicknesses and/or surface structures (i.e., mesh density, openness) for the resistive component 32 may be used in conjunction with pieces of varying lengths positioned in various locations adjacent the bead-membrane interface proximate the outlet region to achieve the desired results. Moreover, as described above, it is understood that non-mesh type resistive components 32 such as film sheets or any other suitable material adapted to provide a layer of substantially non-conducting particles may also be used in accordance with the present invention, and that several pieces of varying lengths may be strategically placed in various locations on one or both of the ion-selective membranes 22, 24 (on either the dilute or concentrate sides of the membranes) to alter the conductivity of predetermined zones within the dilute chamber 20 without departing from broader scope of the present invention.

Figure 1B:
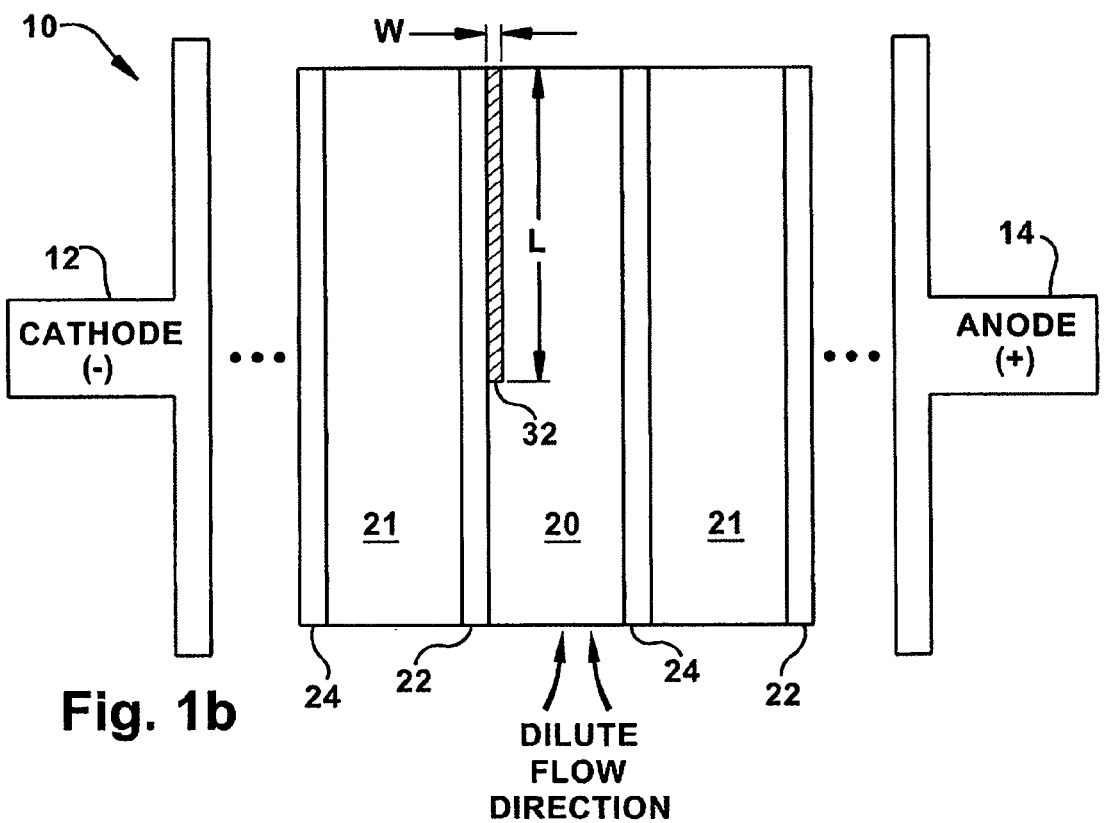
FIG. 1b is a schematic, cross-sectional view through an ion-depleting chamber according to an exemplary embodiment of the present invention, illustrating another configuration of a resistive component coupled to the dilute side of the cation-selective permeable membrane.
Figure 1C:
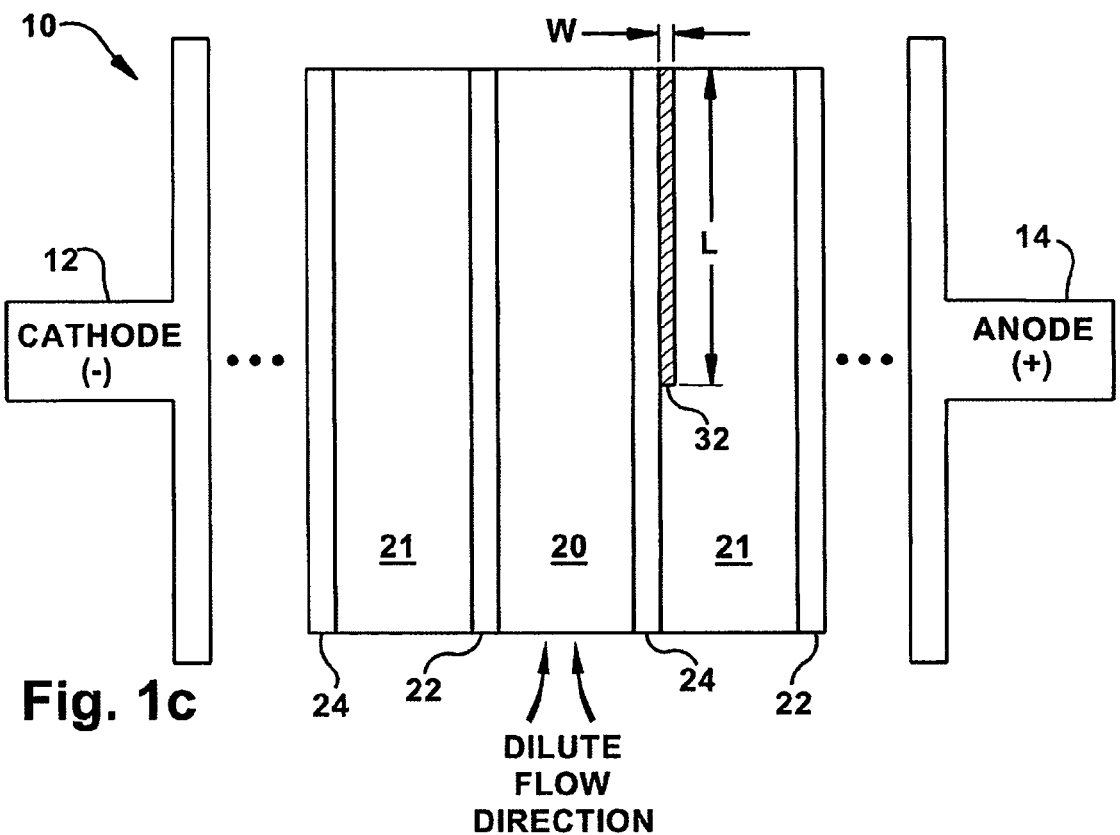
FIG. 1c is a schematic, cross-sectional view through an ion-depleting chamber according to an exemplary embodiment of the present invention, illustrating another configuration of a resistive component coupled to the concentrate side of the anion-selective permeable membrane.
Figure 1D:
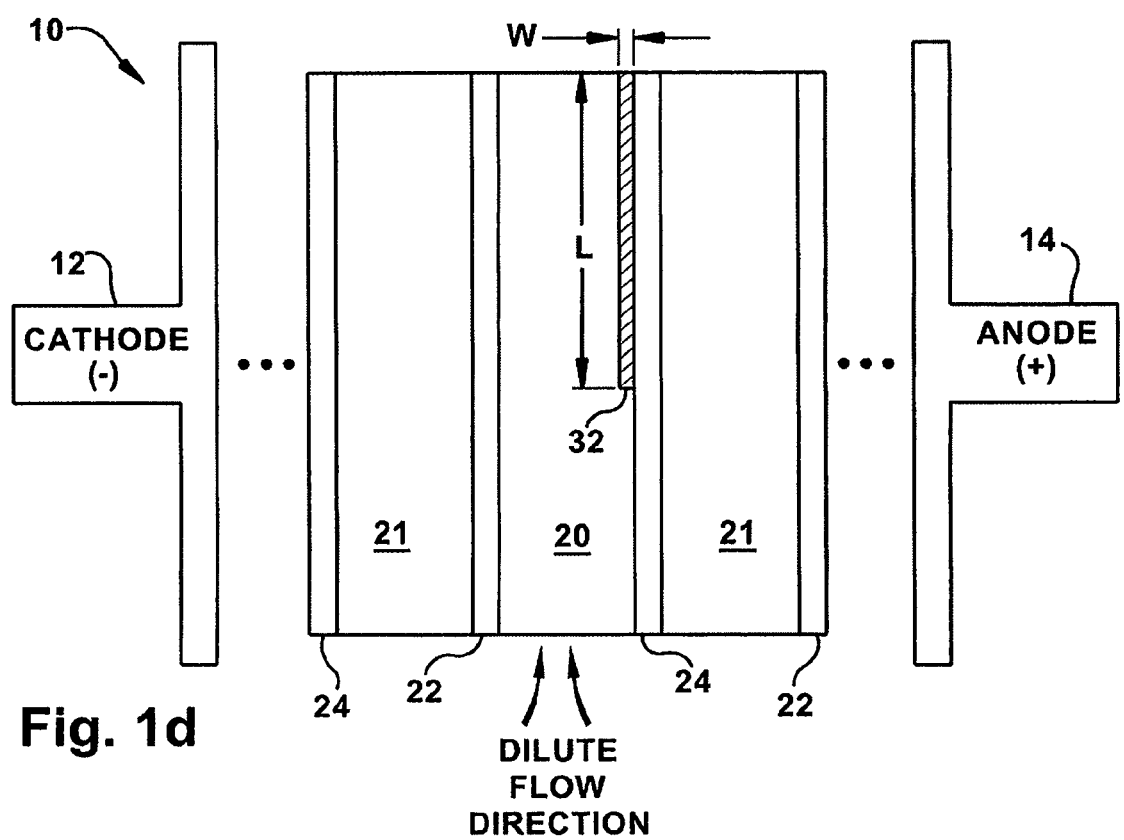
FIG. 1d is a schematic, cross-sectional view through an ion-depleting chamber according to an exemplary embodiment of the present invention, illustrating another configuration of a resistive component coupled to the dilute side of the anion-selective permeable membrane.

In one embodiment illustrated in FIG. 1a, the resistive component 32 is positioned on the outlet half of the cation membrane 22 on the concentrate side of the membrane 22. Alternatively, the resistive component 32 may be placed on the dilute side of the cation membrane 22 as shown in FIG. 1b. In other exemplary embodiments illustrated in FIGS. 1c and 1d, the resistive component 32 is shown placed on the outlet half of the anion membrane 24 on the concentrate side (FIG. 1c) or on the dilute side (FIG. 1d). It is also understood that various combinations and permutations of the illustrated exemplary embodiments may be employed without departing from the broader scope and spirit of the present invention.

Also, in any of the embodiments disclosed herein, the present invention may be accomplished by the addition of a resistive component into the ion exchange bed proximate the outlet region between bead-bead interfaces in either the diluting or concentrating chambers. This has been demonstrated using a polymer melt that gave a partial bead coating, with results being that the bead-bead interface between the beads is decreased, thus increasing the electrical resistance between the beads, and concomitantly increasing the electrical resistance of the outlet region with respect to the inlet region. In addition to ion exchanging beads, it is also contemplated that the present invention could be practiced by placing a resistive component between other types of ion exchanging media particles such as ion exchanging fiber or film particles proximate the outlet region to increase the electrical resistance of the outlet region with respect to the inlet region. In addition, in any of the embodiments described herein, the conductivity of the ion exchange bed can be altered by varying the mass of ion exchange material per unit volume in a particular zone of the bed to increase or reduce the bead and/or particle contact pressure.

In operation, a liquid to be purified is fed into the inlet region of the dilute chamber 20 in the direction shown by the dilute flow direction arrows. In turn, purified water then exits the outlet region of the chamber 20. An electric field is applied across the anode 14 and cathode 12 at the opposite ends of the module 10, wherein electric current passes perpendicularly to the direction of fluid flow in a manner known in the art such that the dissolved cationic and anionic components migrate from the ion exchange resin beads or other ion exchange fiber or film particles (not shown) in the direction of their corresponding electrodes 12, 14. Cationic components migrate through the cation-permeable membrane 22 into the adjacent cathode facing ion-concentrate chamber 21. The process for the anionic components is similar but occurs in the opposite direction wherein anionic components migrate through the anion-permeable membrane 24 into the anode facing ion-concentrate chamber 21. In this way, ionic components are depleted from the fluid flowing through the dilute chamber 20, thereby forming a high-purity fluid stream exiting the outlet region of the dilute chamber 20.

The following example further illustrates the broad applicability of the present invention, and is not to be considered as limiting the scope of the invention.

EXAMPLE 1

Figure 2A:
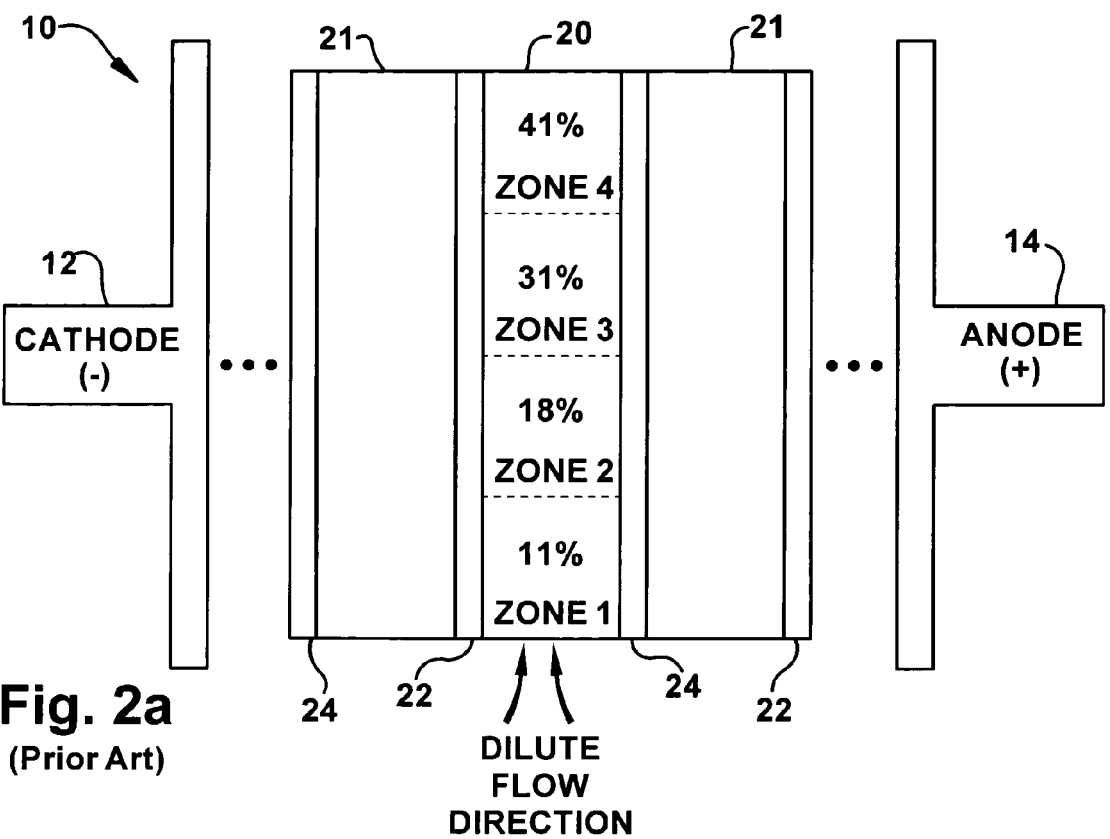
FIG. 2a is a schematic, cross-sectional view through an ion-depleting chamber of a conventional electrodeionization (EDI) device, illustrating the electrical current distribution percentage in selected zones of the chamber.

An aqueous solution containing $NaHCO_3$ with a Total Exchangeable Anion (TEA) concentration of 20 ppm as $CaCO_3$ also containing 250 ppb of $SiO_2$ was fed through a conventional EDI module as shown in FIG. 2A. In this Example 1, the fluid exiting the dilute chamber 20 was found to include approximately 15-18 ppb of remaining $SiO_2$. The current distribution in Zones 1-4 as measured throughout the dilute chamber 20 are shown in FIG. 2A, wherein the current distribution was as follows: Zone 1=11%; Zone 2=18%; Zone 3=30%; and Zone 4=41%. Accordingly, it is apparent that about 71% of the current is located proximate the outlet half of the dilute chamber (i.e., Zones 3 and 4) compared with about 29% being located proximate the inlet half of the dilute chamber (i.e., Zones 1 and 2). This imbalance of current distribution toward the outlet region of the dilute chamber indicates that a high percentage of the flow length through the dilute chamber is being devoted to the removal of the highly ionized species, whereas the portion of the flow length near the outlet region is being used to remove the weakly ionized species, i.e., $SiO_2$.

Figure 2B:
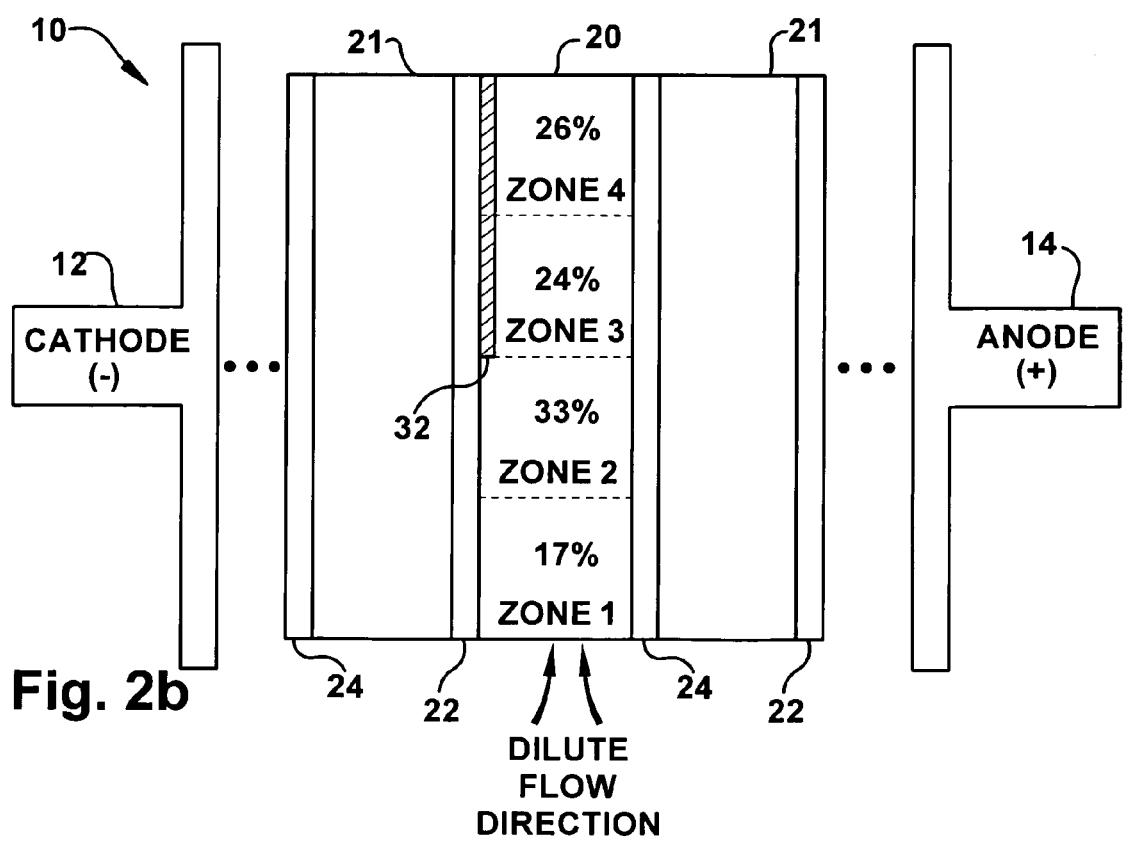

By comparison, the EDI module configured in accordance with the present invention including resistive component 32 positioned near the outlet region of the dilute chamber 20 is shown to have effectively altered the current distribution throughout Zones 1-4 of the dilute chamber as shown in FIG. 2B. Here, it is apparent the current distribution is more balanced throughout the entire chamber, wherein the current distribution was as follows: Zone 1=17%; Zone 2=33%, Zone 3=24%; and Zone 4=26%. Accordingly, it is apparent that the current distribution is more balanced between the inlet and outlet regions of the dilute chamber 20, wherein about 50% of the current is distributed in Zones 1 and 2 (i.e., inlet region) and about 50% is distributed in Zones 3 and 4 (i.e., outlet region). Due to the improved current distribution, the fluid exiting the outlet side of the dilute chamber 20 was found to comprise a reduced amount of approximately 5-6 ppb of remaining $SiO_2$. Therefore, the EDI device configured with a resistive component 32 in accordance with the present invention effectively improved the current distribution throughout the dilute chamber 20, with results being that the $SiO_2$ content of the fluid exiting the device was reduced from approximately 15-18 ppb to approximately 5-6 ppb. These results show that the mesh resistive component 32 configured in accordance with the present invention has successfully been utilized to shift current toward the inlet region (Zones 1 and 2), thus enhancing overall deionization performance.

As shown in FIGS. 2a and 2b, the effectiveness of the EDI device which has been configured in accordance with the present invention with a resistive component 32 (as shown in FIG. 2b) was evaluated with respect to a conventional EDI device not comprising a resistive component (as shown in FIG. 2a). For purposes of this Example 1, the resistive component 32 was placed on the dilute side of the cation membrane 22 in the outlet half of the chamber, although it is understood that the resistive component 32 could be placed on either side of the cation or anion membrane proximate the outlet half of the chamber to achieve the same or similar results. The resistive component 32 was a polymer mesh having a length covering approximately 50 percent of the overall length of the dilute chamber 20, although fractional lengths greater than or less than 50 percent could also be used without departing from the broader scope of the invention.

As can be seen from the current distribution percentages in Zones 1-4 of the dilute chamber 20 of FIG. 2b, it is apparent that the resistive component 32 effectively increases the resistance of the outlet region of the chamber 20 by restricting the bead-membrane contact area at the dilute chamber 20/cation membrane 22 interface. Consequently, as evidenced from a comparison of the current distribution percentages in Zones 1-4 of FIG. 2a and FIG. 2b, the percentage current distribution in the inlet half (i.e., Zones 1, 2) of the chamber has increased, while the percentage current distribution in the outlet half (i.e., Zones 3, 4) has decreased due to the higher resistance in the outlet half attributable to the resistive component 32. Consequently, a higher percentage of current in the inlet region improves overall deionization performance as shown by the results of Example 1 wherein the $SiO_2$ content of the fluid exiting the device was reduced from approximately 15-18 ppb to approximately 5-6 ppb.

While the disclosure has been illustrated and described in typical exemplary embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the scope of the disclosure as defined by the following claims.

What is claimed is:

1. An electrodeionization device for removing ions from liquids passed therethrough, comprising:
    at least one dilute chamber having an inlet region and an outlet region disposed between ion-selective permeable membranes;
    at least one concentrate chamber positioned adjacent at least one of said ion-selective permeable membrane;
    at least one resistive component coupled to said at least one ion-selective permeable membrane proximate said outlet region so as to increase electrical resistance of said outlet region relative to said inlet region to thereby increase current distribution at said inlet region.

2. The device of claim 1, wherein one of said ion-selective permeable membranes is an anion membrane and the other said ion-selective permeable membrane is a cation membrane.

3. The device of claim 2, wherein said at least one resistive component comprises a polymer mesh material.

4. The device of claim 2, wherein said at least one resistive component comprises a bead resin material.

5. The device of claim 2, wherein said at least one resistive component is coupled between said anion membrane and said dilute chamber.

6. The device of claim 2, wherein said at least one resistive component is coupled between said anion membrane and said concentrate chamber.

7. The device of claim 2, wherein said at least one resistive component is coupled between said cation membrane and said dilute chamber.

8. The device of claim 2, wherein said at least one resistive component is coupled between said cation membrane and concentrate chamber.

9. A method for removing ions from liquids in an electrodeionization device, comprising:
providing at least one dilute chamber having an inlet region and an outlet region disposed between ion-selective permeable membranes;
providing at least one concentrate chamber positioned adjacent at least one of said ion-selective permeable membranes;
coupling at least one resistive component to said at least one ion-selective permeable membrane proximate said outlet region so as to increase electrical resistance of said outlet region with respect to said inlet region;
passing liquids through said dilute chamber from said inlet region to said outlet region; and
applying an electric field across said dilute chamber transverse to a flow direction of said liquids, wherein said at least one resistive component increases a distribution of electrical current flowing through said inlet region relative to said outlet region, to thereby increase current distribution at said inlet region.

10. The method of claim 9, wherein said resistive component comprises a polymer mesh material, said method further comprising the step of controlling the magnitude of said increase in electrical resistance by varying the openness of said mesh, varying the thickness of said mesh, varying the length of said mesh, varying the location of said mesh, varying the quantity of said meshes, or by combinations thereof.

11. The method of claim 9, wherein said resistive component comprises a bead resin material.

12. The method of claim 9, wherein one of said ion-selective permeable membranes is an anion membrane and the other said ion-selective permeable membrane is a cation membrane.

13. The method of claim 12, wherein said at least one resistive component is coupled between said anion membrane and said dilute chamber.

14. The method of claim 12, wherein said at least one resistive component is coupled between said anion membrane and said concentrate chamber.

15. The method of claim 12, wherein said at least one resistive component is coupled between said cation membrane and said dilute chamber.

16. The method of claim 12, wherein said at least one resistive component is coupled between said cation membrane and said concentrate chamber.

17. A method for removing ions from liquids in an electrodeionization device, comprising:
providing a dilute chamber having an inlet region and an outlet region disposed between ion-selective permeable membranes;
coupling at least one concentrate chamber to one of said ion-selective permeable membranes;
providing a plurality of ion-exchanging particles within at least one of said chambers;
providing at least one resistive component proximate said outlet region between two or more said particles so as to increase electrical resistance of said outlet region relative to said inlet region;
passing liquids through said dilute chamber from said inlet region to said outlet region; and
applying an electric field across said dilute chamber transverse to a flow direction of said liquids, wherein said at least one resistive component increases a distribution of electrical current flowing through said inlet region, thereby enhancing ion-depleting performance of said electrodeionization device.

18. The method of claim 17, wherein said resistive component comprises a polymer melt material.

* * * * *